Jan. 4, 1966     O. MITCHELL     3,226,943
EVAPORATOR TEMPERATURE CONTROL DEVICE
Filed May 24, 1962
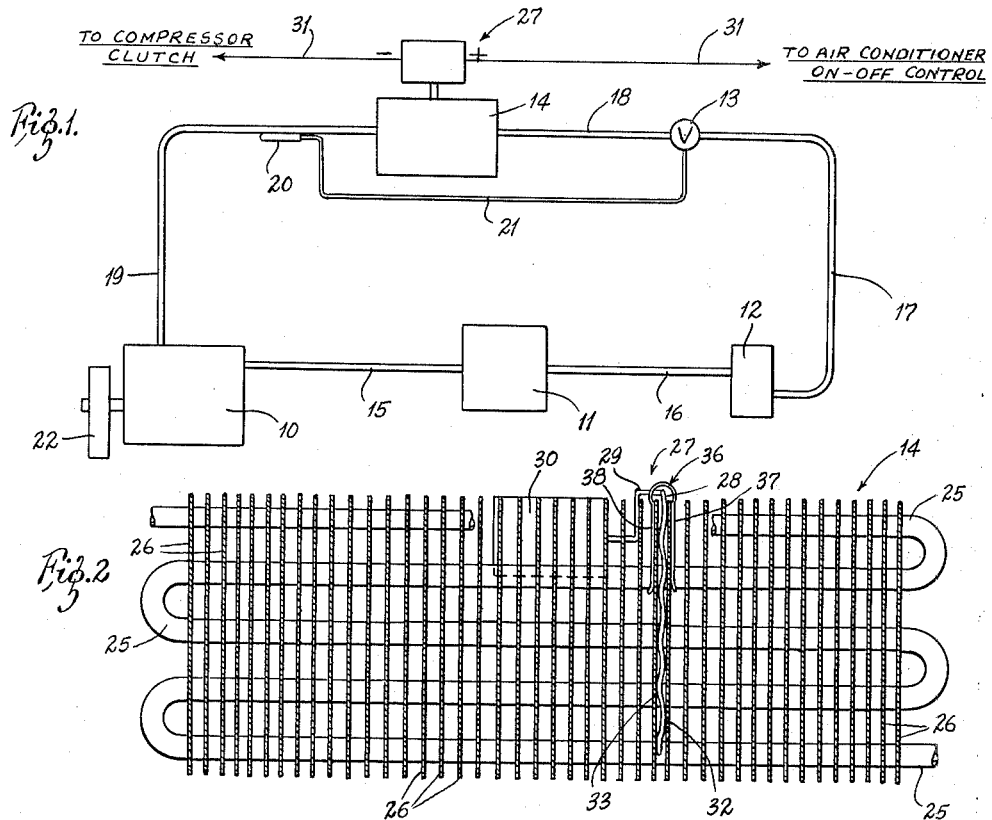
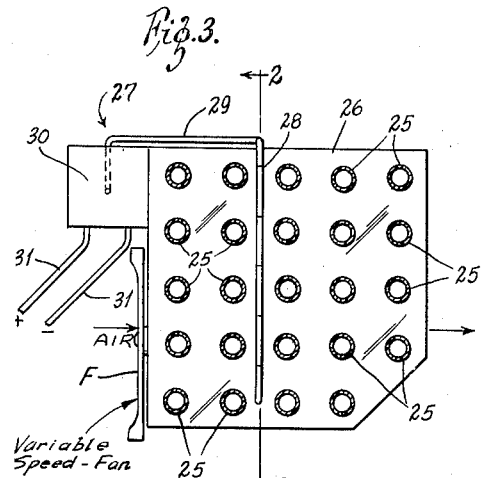
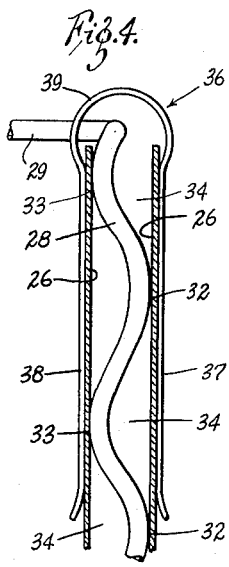
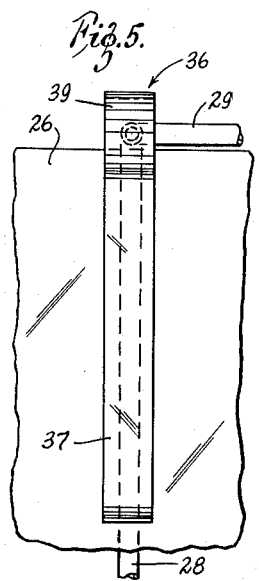
INVENTOR:
ORVILLE MITCHELL,
BY Kingsland, Rogers, Ezell & Robbins
ATTORNEYS

United States Patent Office 3,226,943
Patented Jan. 4, 1966

3,226,943
EVAPORATOR TEMPERATURE CONTROL DEVICE
Orville Mitchell, Dallas, Tex., assignor to John E. Mitchell Company, Dallas, Tex., a corporation of Missouri
Filed May 24, 1962, Ser. No. 197,441
7 Claims. (Cl. 62—227)

This invention relates to a temperature control device for a refrigeration system, and particularly to a temperature control device for use with automobile air conditioners to prevent the collection of ice on the evaporator coil while regulating the minimum evaporator coil temperature as a function of the condition of the air passing across the evaporator coil.

The problems associated with refrigerating an automobile passenger compartment are quite different from those related to cooling a room. The passenger compartment is largely glass which transmits a great amount of heat to the compartment. Furthermore, the automobile passenger compartment is subject to widely varying atmospheric air conditions as the car moves rapidly from one environment to another. As such, the cooling needs of the compartment change rapidly as the conditions of the atmospheric air change. Atmospheric air varies from extremely high temperatures of 140° F. or more down to about 70° F., and from extremely wet air on cloudy or rainy days and in humid climates to extremely dry air in dry climates. Also, as the speed of the automobile changes, the compressor speed varies with attendant variations in evaporator pressures. The temperature of the refrigerant in the evaporator coil varies correspondingly to its pressure. With these variables, it is a principal object of this invention to provide a temperature control that establishes minimum coil temperatures that are just above the temperatures at which ice would form on the coil and which functions in accurate response to the various conditions of atmospheric air passing over the evaporator coil.

Another important object of the invention is to provide a temperature control for an automobile air conditioner that prevents the formation of ice on the evaporator coil while maintaining a low limit of evaporator coil temperature and that does so by distinguishing the evaporator coil load temperature limits caused by wet or dry, hot or cool, or high volume or low volume air passing over the evaporator coil.

Still another object of the invention is to provide an evaporator temperature control that regulates the evaporator coil temperature within small temperature deviations from the permissible low limit regardless of the condition of air passing over the evaporator. It has been found that, for any given low limit set by this control, the fin and air temperatures stay within 3° F. of that limit.

Another object of the invention is to provide an evaporator temperature control that can be installed on existing air conditioners or built into new ones as they are constructed.

Another object of the invention is to provide an evaporator temperature control that allows maximum cooling by the air conditioner while preventing icing of the evaporator.

Still another object of the invention is to provide an evaporator temperature control that is locked in place on the evaporator and continues to operate properly even under rough driving conditions.

Other objects and advantages will be apparent to those skilled in the art.

In the drawing:

FIGURE 1 is a schematic diagram of the automobile air conditioning system incorporating this invention;

FIGURE 2 is a front elevation view partly in section of the evaporator coil taken along the line 2—2 of FIGURE 3;

FIGURE 3 is a side elevation view of the evaporator coil as viewed from the left side of FIGURE 2, but with some of the fins and the spring retainer removed;

FIGURE 4 is a fragmentary front elevation view partly in section on an enlarged scale, particularly showing the corrugated sensing bulb and the spring retainer;

FIGURE 5 is a fragmentary side elevation view of the spring retainer of FIGURE 4; and FIGURE 6 is a schematic wiring diagram for the device.

As shown in FIGURE 1, this automobile air conditioner has the usual components including a compressor 10, a condenser 11, a receiver 12, and expansion valve 13, and an evaporator 14. These components are all connected together in series by refrigerant pipe lines 15, 16, 17, 18 and 19. The expansion valve 13 has a sensing bulb 20 positioned next to the refrigerant pipe 19 on the outlet side of the evaporator 14. The sensing bulb 20 is connected to the expansion valve 13 by a capillary tube 21.

The compressor 10 is cycled by a clutch 22 that is preferably a magnetic clutch conventional in the art. The clutch is disengaged whenever the air conditioner control is turned off (the circuit for this is shown in FIGURE 6 and is described hereinafter). The clutch 22 is normally engaged when the air conditioner control is turned on, except that the temperature control to be described hereinafter also cycles the clutch 22 between engaged and disengaged conditions.

As shown in FIGURE 2, the evaporator comprises one or more coils 25 which contact a large number of parallel metal fins 26. According to this invention, a temperature control device 27 is mounted on the evaporator 14. The temperature control device 27 comprises a corrugated sensing bulb 28 that fits between two fins 26 and makes intermittent contact with these fins. The bulb 28 is connected by a capillary tube 29 to a contact box 30 which has positive and negative electrical wires 31 leading from it. The bulb 28 is charged with a temperature responsive fluid, such as one of the well known fluids that change volume with changing temperatures. As shown in FIGURE 6, the contact box 30 and the clutch 22 are wired in series with the automobile battery and the air conditioner on-off switch X. Thus, one of the wires 31 is connected to the magnetic clutch 22 and the other is connected to the air conditioner on-off control X, e.g., the contact box 30 is in series with the clutch 22 and the on-off control in the D.C. automobile battery circuit. The contact box 30 is conventional in that it has electrical contact elements that are closed whenever the temperature of the bulb 28 is above a predetermined value and are opened when the temperature of the bulb 28 drops below a predetermined value. The contact opening and closing temperatures may be different to prevent constant recycling of the device at a critical temperature. Thus, when the temperature at the sensing bulb 28 drops below a pre-determined value, the electrical contact elements in the contact box 30 open and the compressor clutch 22 is disconnected. When the temperature of the sensing bulb 28 rises above another predetermined value, the contact elements close and the compressor clutch 22 is reengaged.

As particularly shown in FIGURE 4, the temperature sensing bulb 28 is uniformly corrugated throughout its entire length to provide evenly spaced extreme contact points 32 on one side and evenly spaced contact points 33 on the other side. These contact points 32 and 33 must contact opposite ones of the fins 26 if the control device is to operate properly. At the same time, there are a plurality of spaces 34 between the contact points 32 and the contact points 33 through which air can readily flow.

As shown in FIGURES 4 and 5, the fins 26 are held in contact with the extreme points 32 and 33 of the corrugated sensing element 28 by a metal clip 36. The clip 36 has opposed legs 37 and 38 spring-biased toward one another by a connecting loop 39 at their upper ends. Thus, the clip 36 holds the fins 26 against the contact points of the sensing element 28 while the rigidity of the capillary tube 29 orients the sensing bulb 28 and holds it in place.

Now the location of the sensing bulb 28 is extremely important for the proper operation of this temperature control device. Different coils will require some experimentation to determine the exact optimum bulb location, but, in general, it may be stated that the sensing bulb 28 should be located downstream of the inlet air side to the evaporator 14 a sufficient distance to measure the effects of changing air volumes such as are conventionally caused by a variable speed fan F (shown schematically in FIGURE 3); upon the temperature of the evaporator coil; and the sensing bulb 28 should be located upstream of the cold or air outlet side of the evaporator 14 to prevent influence on the bulb temperature caused by condensation on the colder portions of the coil. In practice, it has been found that the optimum location for the sensing bulb 28 is approximately one-third of the distance from the air inlet side toward the air outlet side of the evaporator.

The control installed as set forth is highly effective in preventing formation of ice on the evaporator coil. At the same time, it allows the lowest possible coil temperature according to the conditions of air passing through the evaporator. For example, with favorable air conditions of hot, dry, high volume air, the control can maintain a coil temperature of 24° F., whereas, at the other extreme, when the air is cold and moist and passing through the evaporator at low volume, the control establishes a low coil limit of 34° F., all automatically and with a single fixed setting of the control.

It should be pointed out that this control can be used with other conventional controls. For example, the usual operation manipulated controls provided on air conditioners enabling a selection of air conditioning temperature can still be used, but if the operator sets the manual control at its cold limit, then the control of this invention comes into play when there is danger of icing of the evaporator.

Various changes and modifications may be made within the process of this invention as will be readily apparent to those skilled in the art. Such changes and modifications are within the scope and teaching of this invention as defined by the claims appended hereto.

What is claimed is:

1. In combination, a mobile vehicle air conditioner that operates under various conditions of atmospheric air including variations in air temperature, and volume rate of air flow wherein the air conditioner includes an evaporator having a coil and a plurality of fins in contact with the coil, the evaporator having opposite air inlet and air discharge sides, means subjecting the evaporator to variable volumes of air flow, and a temperature sensing device comprising a temperature sensing element in contact with at least one of the fins at a point upstream of the discharge air side of the evaporator and downstream of the inlet air side of the evaporator, and means responsive to the temperature sensed by the element for maintaining the temperature of the evaporator coil at a predetermined value.

2. A temperature control device for an air conditioning system having an evaporator with parallel heat conductive fins comprising a corrugated sensing element between two adjacent fins and contacting spaced points on the two adjacent fins, a clamp for holding the fins in contact with the sensing element, the sensing element having spaces between the contact points for admitting air flow and regulator means connected to respond to temperatures sensed by the element for cycling the air conditioning system to prevent icing of the evaporator.

3. In a mobile vehicle air conditioning system having a compressor, a condenser, an expansion device and an evaporator piped in series, the evaporator being subjected to variable volumes of air flow through it and comprising at least one refrigerant coil in contact with a plurality of fins a temperature control device comprising a temperature sensing element shaped to make intermittent contact with at least one fin, a spring biased clamp for holding the element in contact with the fin, and a control connected to the sensing element for activating and deactivating the compressor in response to changes in temperature produced by variations of air and sensed by the sensing element.

4. The temperature control device of claim 3 wherein the sensing element is corrugated and fits between two adjacent fins and the extreme points on the corrugations contact both fins while permitting air to pass between the fins between the contact points.

5. The temperature control device of claim 4 wherein the evaporator has opposite air inlet and outlet sides and the sensing element is located intermediate of the air inlet and outlet sides of the evaporator.

6. In combination, a mobile vehicle air conditioner that operates under various conditions of atmospheric air including variations in air temperature, and volume rate of air flow wherein the air conditioner includes an evaporator having a coil and a plurality of fins in contact with the coil, the evaporator having opposite air inlet and air discharge sides, means subjecting the evaporator to variable volumes of air flow, and a temperature sensing device comprising a temperature sensing element in contact with at least one of the fins at a point approximately one-third the distance from the air inlet side toward the air discharge side, and means responsive to the temperature sensed by the element for maintaining the temperature of the evaporator coil at a predetermined value.

7. In combination, mobile vehicle air conditioner that operates under various conditions of atmospheric air including variations in air temperature, and volume rate of air flow wherein the air conditioner includes an evaporator having a coil and a plurality of fins in contact with the coil, the evaporator having opposite air inlet and air discharge sides, means subjecting the evaporator to variable volumes of air flow, and a temperature sensing device comprising a temperature sensing bulb shaped to provide points of contact with two fins while providing uniform passages for air flow around the sensing bulb, the bulb being positioned upstream of the discharge air side of the evaporator and downstream of the inlet air side to the evaporator, and means responsive to the temperature sensed by the element for maintaining the temperature of the evaporator coil at a predetermined value.

References Cited by the Examiner
UNITED STATES PATENTS

| | | | |
|---|---|---|---|
| 2,081,479 | 5/1937 | Finak | 62—229 |
| 2,350,249 | 5/1944 | Osborn | 62—89 |
| 2,692,481 | 10/1954 | Schweller | 62—229 |
| 2,866,323 | 12/1958 | Candor | 62—180 |
| 2,947,153 | 8/1960 | Atchison | 62—140 X |
| 3,004,400 | 10/1961 | Mann | 62—419 X |
| 3,026,688 | 3/1962 | O'Connell | 62—227 |
| 3,105,364 | 10/1963 | O'Connell | 62—419 X |

ROBERT A. O'LEARY, *Primary Examiner.*

MEYER PERLIN, *Examiner.*